United States Patent
Steffen et al.

(10) Patent No.: US 11,925,253 B2
(45) Date of Patent: Mar. 12, 2024

(54) WEARABLE DRIVE SYSTEM FOR A WORK APPARATUS

(71) Applicant: Wacker Neuson Produktion GmbH & Co. KG, Munich (DE)

(72) Inventors: Michael Steffen, Munich (DE); Christian Glanz, Dachau (DE); Patrick Diller, Baar-Ebenhausen (DE); Rudolf Berger, Grünwald (DE)

(73) Assignee: Wacker Neuson Produktion GmbH & Co KG, Reichertshofen (DE)

( * ) Notice: Subject to any disclaimer, the term of this patent is extended or adjusted under 35 U.S.C. 154(b) by 0 days.

(21) Appl. No.: 17/323,533

(22) Filed: May 18, 2021

(65) Prior Publication Data

US 2021/0267357 A1    Sep. 2, 2021

Related U.S. Application Data

(62) Division of application No. 16/523,296, filed on Jul. 26, 2019, now abandoned.

(30) Foreign Application Priority Data

Jul. 31, 2018 (DE) ...................... 10 2018 118 555.3

(51) Int. Cl.
*A45F 3/08*    (2006.01)
*A01D 34/90*   (2006.01)
*B25F 5/02*    (2006.01)
*E04G 21/08*   (2006.01)

(52) U.S. Cl.
CPC .................. *A45F 3/08* (2013.01); *B25F 5/02* (2013.01); *A01D 34/902* (2013.01); *E04G 21/08* (2013.01)

(58) Field of Classification Search
CPC ............ A45F 3/08; A45F 3/10; A01D 34/902
See application file for complete search history.

(56) References Cited

U.S. PATENT DOCUMENTS

| | | | | |
|---|---|---|---|---|
| 4,574,481 A | * | 3/1986 | Ericsson | ................. B27B 17/00 30/296.1 |
| 5,289,605 A | * | 3/1994 | Armbruster | ......... A47L 11/4005 15/230.14 |
| 6,053,259 A | * | 4/2000 | Kojima | ................ A01D 34/902 173/171 |
| 6,084,327 A | | 7/2000 | Steffen | |

(Continued)

FOREIGN PATENT DOCUMENTS

| | | |
|---|---|---|
| DE | 29903963 | 5/1999 |
| DE | 102004001551 | 8/2005 |

(Continued)

*Primary Examiner* — Derek J Battisti
(74) *Attorney, Agent, or Firm* — Boyle Fredrickson S.C.

(57) ABSTRACT

A drive system includes a carrying device with a wearable carrying frame, an energy store carried by the carrying frame, and at least one electric drive motor carried by the carrying frame. A coupling device is configured to mechanically couple a work apparatus to the drive system. The carrying device is formed as a shoulder bag or backpack, having at least one strap that permits the carrying device to be worn over a shoulder of a user. Two straps may be provided that permit the carrying device to be worn over both shoulders of a user. Also disclosed is a tool having such a drive system and a work apparatus, which may be concrete vibrator.

18 Claims, 8 Drawing Sheets

(56) References Cited

U.S. PATENT DOCUMENTS

| | | | |
|---|---|---|---|
| 6,122,830 A * | 9/2000 | Jarzombek | A01D 34/902 30/276 |
| 6,619,832 B1 | 9/2003 | Steffen | |
| 7,382,104 B2 * | 6/2008 | Jacobson | A01D 34/902 30/296.1 |
| 8,918,956 B2 | 12/2014 | Pellenc | |
| 2005/0161305 A1 | 7/2005 | Jenni et al. | |
| 2005/0163566 A1 * | 7/2005 | Lindely | F02P 1/083 404/114 |
| 2010/0000097 A1 | 1/2010 | Johnson | |
| 2015/0113759 A1 * | 4/2015 | Fukunaga | A45F 3/10 15/327.5 |

FOREIGN PATENT DOCUMENTS

| | | |
|---|---|---|
| EP | 0685302 | 12/1995 |
| EP | 1972362 | 9/2008 |
| GB | 1075857 | 7/1967 |

\* cited by examiner

WEARABLE DRIVE SYSTEM FOR A WORK APPARATUS

CROSS REFERENCE TO A RELATED APPLICATION

This application is a divisional of U.S. patent application Ser. No. 16/523,296, filed Jul. 26, 2019 and entitled Wearable Drive System for a Work Apparatus, the contents of which are hereby incorporated by reference in their entirety.

BACKGROUND OF THE INVENTION

1. Field of the Invention

The invention relates to a wearable drive system for a work apparatus, in particular a portable energy store with a drive for tools or work machines or apparatuses.

2. Description of the Related Art

As work apparatuses, internal vibrators for concrete compaction are known in a wide range of variants. Commonly, in the case of such an internal vibrator, a so-called vibrator cylinder is driven with a rotating imbalance by a drive motor. The drive motor may be a combustion motor or an electric motor. If a combustion motor is used, the rotational movement generated by the motor is conducted to the vibrator cylinder by means of a flexible shaft in order to drive the imbalance in rotation there. The combustion motor may in this case be worn on the back of the operator. The operator is thus independent of a power source for the internal vibrator and can move freely around the construction site without cables. Here, the operator is however exposed to the noise and the exhaust gases of the combustion motor.

It is likewise known for the internal vibrator to be driven by means of an electric motor. The electric motor may be provided directly in the vibrator cylinder, as is known from DE 92 17 854 U1. For the operation of the electric motor, a corresponding power supply on the construction site is known.

Storage battery backpack systems are known which are available both as exchangeable systems (for the exchange of the storage battery which serves as energy store) and as systems with a fixedly installed storage battery. As an electrical output of these systems, the DC voltage of the storage battery is made available, which is then, at a connected work apparatus, either switched directly to a drive motor or fed to an intermediate circuit of a downstream frequency transformer, which then drives a three-phase motor in the work apparatus. The drive motor itself, and the frequency transformer, are in this case not situated on the carrying system of the storage battery.

DE 299 03 963 U1 has disclosed a storage battery backpack with electric motor situated thereon, which electric motor drives a hedge trimmer via a flexible shaft. The hedge trimmer is however fixedly connected to the backpack, such that the backpack is part of the hedge trimmer and forms a structural unit therewith.

The storage battery backpack systems that are thus known require a high level of outlay in terms of construction, because it is necessary to provide firstly the storage battery backpack and secondly the work apparatus having a dedicated drive motor.

The invention is based on the object of improving the apparatuses known from the prior art without accepting a restriction in functionality or convenience.

SUMMARY OF THE INVENTION

The object is achieved according to the invention by providing a drive system including a carrying device with a wearable carrying frame, an energy store carried by the carrying frame, at least one electric drive motor carried by the carrying frame, and a coupling device for the mechanical coupling of a work apparatus to be driven by the drive motor.

The carrying frame, which constitutes a major constituent part of the carrying device, may be designed in any desired form, for example also as a carrying plate, carrying frame or the like.

The energy store carried by the carrying frame may in particular be a rechargeable storage battery such as is known per se, that is to say a rechargeable electric battery. Here, the energy store provides, in particular, a direct current, which is conducted to the drive motor. If required, the direct current may be transformed in a suitable manner with regard to the voltage and/or the frequency by means of a transformer, which will be discussed further below. For the actuation of a three-phase motor in particular, it is necessary for the current to be provided with a suitable characteristic.

The drive system thus has, at its core, the carrying device with the wearable carrying frame, to which the further components, in particular the energy store and the drive motor, are fastened. The drive motor is supplied with electrical energy by the energy store. The coupling device serves in particular for transmitting a torque that is generated by the drive motor. Here, the coupling device may be attached to a motor shaft of the drive motor in order to enable the work apparatus that is separate from the drive system to be coupled.

The work apparatus thus does not constitute a part of the drive system. Rather, the drive system according to the invention and the work apparatus that is to be driven by the drive system are two separate or separable components.

For the operation of the work apparatus, the work apparatus is coupled to the drive system (via the coupling device) in order to conduct the rotational movement of the drive motor to the work apparatus. However, when it is not intended to use the work apparatus, it can be decoupled and separated from the drive system. In this way, it is also possible for different work apparatuses or even different types of work apparatuses to be coupled to the drive system. Here, the work apparatuses have in common only the fact that they are provided for being driven by means of a rotational movement.

Suitable work apparatuses are for example internal vibrators for concrete compaction, in the case of which an imbalance situated in a vibrator cylinder is set in rotation via a flexible shaft. The vibration generated by the rotating imbalance leads to a vibration of the vibrator cylinder surrounding said imbalance, which can be utilized for the compaction of concrete that is still in a flowable state.

Other types of work apparatuses are likewise also possible, such as for example a hedge trimmer, a saw, a mowing device etc.

At least one drive motor should be provided on the carrying frame. It is however also possible for multiple drive motors to be attached to the carrying frame, which drive motors themselves each drive different work apparatuses.

Various types of electric motors are suitable as a drive motor. The electric motors may be provided without commutation electronics (for example DC motors, brushed DC motors, universal motors). They may likewise also have commutation electronics. These types include three-phase motors (three-phase asynchronous machines, three-phase synchronous machines, cascade machines, stepper motors, brushless DC motors), linear motors (for example a solenoid), AC motors (capacitor motors, split-pole motors, synchronous motors/single-phase asynchronous motors, reluctance motors, magnetic motors), transverse flux machines, repulsion motors (permanently excited DC motors, electrically excited or externally excited DC motors) and piezo motors.

The carrying device may be formed as a shoulder bag or as a backpack, having at least one strap serving as a shoulder strap for the carrying device to be worn over a shoulder of the user. The strap may thus be formed as a carrying strap, such that the operator can wear the carrying device comfortably on their shoulder, whereby the operator is relieved of difficult carrying work. The shoulder strap may also be designed as a dimensionally stable hoop which is worn over the shoulder.

The strap may be fastened to the carrying frame at at least two fastening points in order to allow the carrying frame to be worn safely.

In one variant, two straps or shoulder straps are provided for the carrying device to be worn over both shoulders of a user. In this case, the carrying device is designed in the manner of a backpack. The two straps are fastened with their ends in each case to the carrying frame at fastening points, specifically in the upper region of the carrying frame and in the lower region of the carrying frame. The user can pull the two straps over their two shoulders and thus wear the carrying device comfortably on their back. It may be expedient for corresponding padding to be provided on the straps or else on that side of the carrying frame which faces toward the user, in order to allow the carrying device to be worn by the user as comfortably as possible.

In the case of the backpack-like design of the carrying device, it may be expedient if the energy store and the drive motor are held on the rear side of the carrying frame, that is to say on that side of the carrying frame which faces away from the user.

The axis of rotation of the motor may extend horizontally in relation to an intended worn state of the drive system. This is the case in particular if the drive system is worn on the shoulders in the manner of a backpack. The motor axis may then run parallel to the direction of arrangement of the two straps or parallel to a shoulder line defined by the two straps. In particular, the motor axis may in this case run transversely with respect to the back of the user and extend to the left and/or to the right. Alternatively, the motor axis may however also extend rearward or downward, for example vertically downward.

The drive motor may be fastened to the carrying frame below the energy store in relation to an intended worn state of the drive system. This leads to an advantageous weight distribution and to an improvement in wearing comfort, and to an increase in working safety, because the rotating motor is not situated in the vicinity of the head of the operator.

The motor may be fastened to the carrying frame by means of a motor holder, wherein the motor holder is designed to move the drive motor relative to the carrying frame. Here, it is possible for the motor holder to hold the drive motor in at least two different positions on the carrying frame, wherein the positions are securely fixable. The fixing may be realized in positively locking or non-positively locking form, and must ensure that the motor is held in the respectively desired position even under load.

The motor holder may in particular be designed to pivot or displace the drive motor relative to the carrying frame. The pivoting of the drive motor may occur about an axis perpendicular to the motor axis. A displacement of the motor may for example be made possible if the motor holder has a rail on which the motor is displaced laterally (to the left or to the right).

A pivoting of the drive motor may make it possible for the coupling device for the coupling of the work apparatus to be positioned selectively to the left of the back of the user or to the right of the back of the user. These positions are made possible by means of a simple pivoting movement about a pivot axis which extends substantially horizontally perpendicularly with respect to the carrying frame and thus perpendicularly with respect to the back of the wearer of the carrying frame.

Depending on the design of the motor holder, it can for example be achieved that the motor shaft of the drive motor can extend in a respectively suitable direction, be it horizontal, vertical or oblique. Accordingly, a flexible shaft, coupled to the motor shaft, of a work apparatus can likewise extend in a suitable direction in order to facilitate the work of the operator and relieve the operator of unnecessary carrying work. It is likewise also possible for various intermediate positions to be assumed and fixed.

The coupling device may be designed for the coupling of a drive shaft for the work apparatus. Here, the coupling device constitutes the system boundary of the drive system according to the invention, whereas the work apparatus can, by means of its drive shaft and a further coupling device that is expediently provided thereon, be coupled to the coupling device of the drive system. The coupling device may in particular be designed as a clutch device in order to ensure a reliable transmission of the torque generated by the drive motor to the work apparatus.

The drive shaft for the work apparatus may be designed as a flexible shaft which runs in a protective hose in order to eliminate a danger to the surroundings.

The coupling device may be formed as a detachable shaft connection and have a corresponding coupling component on the motor shaft. Here, this may for example be a bayonet fastener, a sleeve nut or a pin (stud or bolt) installed transversely with respect to the axis. The flexible shaft belonging to the work apparatus may, in a conventional manner, be designed as a square shaft which is inserted into a corresponding receptacle on the coupling device of the drive system. For the connection of two shaft pieces or ends, there are a wide variety of known machine elements, which shall not be listed in detail at this juncture.

A transformer device may be provided which is carried by the carrying frame and which serves for transforming an electrical current, which is drawn from the energy store, for the drive motor. As discussed above, various types of electric drive motors may be fastened to the carrying frame, which drive motors must be operated in different ways. A suitable electrical current can be provided by means of the transformer device.

The transformer device is typically a frequency transformer such as is known per se, which can convert both the voltage and the frequency of the direct current provided by the energy store. It is thus possible to generate an alternating current with a relatively high or relatively low voltage and changed frequency. The transformer device is in this case electrically connected to the energy store.

From the direct current originating from the energy store, it is thus possible to generate a single-phase or multi-phase current with a special frequency and/or special voltage. The transformer device is known as a component which can convert direct current into a current with a frequency >0, that is to say into an alternating current.

The energy store may be fastened exchangeably to the carrying frame. Said energy store is then easily detachable, possibly without the aid of further tools. For example, said energy store can be removed from the carrying frame by a user through the actuation of a catch or a locking device, and replaced with a further (charged) energy store. To ensure reliable electrical contact between the energy store and a receptacle provided for the latter, it may be expedient for the fastening of the energy store to the carrying frame to be performed during the course of an insertion movement.

The insertion movement may for example take place from above, and a correspondingly oppositely directed removal movement may take place in an upward direction. In this case, the energy store can be reliably held with its full weight in the receptacle. The exchange of the energy store takes place upward via an upper opening of the receptacle.

The energy store and the transformer device may form a structural unit and, for example, be jointly fastened in exchangeable fashion to the carrying frame. In one variant, the structural unit may in turn be dismantlable without tools, for example after being dismounted from the carrying frame. It is however likewise also possible for the structural unit to be designed such that a dismantling and thus separation of the energy store and of the transformer device can be performed only using a tool, possibly only by means of a specialist.

The carrying device may be a waist or hip strap connected to the carrying frame in order to improve wearing comfort. As is common in the case of hiking backpacks, a major part of the backpack weight (in this case the weight of the entire carrying device including the energy store and the drive motor) is supported on the hip of the user by means of the hip strap, whereby the back and the shoulders are relieved of load. In view of the considerable weight, it is thus advantageous if a part of the weight is supported directly on the hip of the user by means of the hip strap.

The hip strap may extend substantially horizontally from the carrying frame and is preferably fastened in the lower region of the carrying frame at respective fastening points. In one variant, the energy store or the transformer device may be fastened to the hip strap and thus to the carrying frame. In this variant, it is duly the case that, as before, said respective energy store or the transformer device is carried by the carrying frame. However, the weight of the component can in this case also be supported directly on the hip of the user. The respective other component then remains on the carrying frame, in particular on the rear side, or on the side facing away from the user, of the carrying frame.

In one embodiment, an electrical connection device may be provided which is carried by the carrying frame and which serves for the connection of a consumer. The consumer may be a further work apparatus, which can be connected to the drive system in addition to the work apparatus already described above. Whereas it is however the case that the above-described work apparatus receives mechanical energy from the electric motor, the further consumer may draw electrical energy directly from the energy store. Accordingly, the connection device may for example be designed in the form of a plug socket or connection socket. Here, the connection contacts may, if necessary, be concealed under an openable flap in order to protect them against external action when they are not in use.

In one variant, a switching device may be provided which is carried by the carrying frame and which serves for the switching of an electrical connection between the energy store and the drive motor and/or between the energy store and the transformer device that is possibly provided. The switching device is thus in particular capable of producing ("on") or breaking ("off") the electrical connection.

Here, it is possible for the switching device to be actuated manually by the operator by means of an operator control device, for example by operating a switch or a button. Further switching functions may also be provided by means of the operator control device, such as for example the selection of a rotational speed or other functions. The operator control unit may be arranged on the carrying frame or else on the shoulder or waist straps.

In all variants, a switching device may be provided which is configured to selectably switch the electrical supply between the energy store and the drive motor. For this purpose, the switching device may for example selectably produce and/or shut off a current flow between the energy store and the transformer device. It is furthermore conceivable for the switching device to be able to produce and/or shut off the current supply between the transformer device and the drive motor. Furthermore, the switching device may also be arranged within the energy store, such that the terminals of the energy store can be switched into a deenergized state during an exchange, and there is thus no danger to a user.

BRIEF DESCRIPTION OF THE DRAWINGS

These and further features and advantages will be discussed in more detail below on the basis of examples with the aid of the accompanying figures, in which.

DETAILED DESCRIPTION

Figure 1:
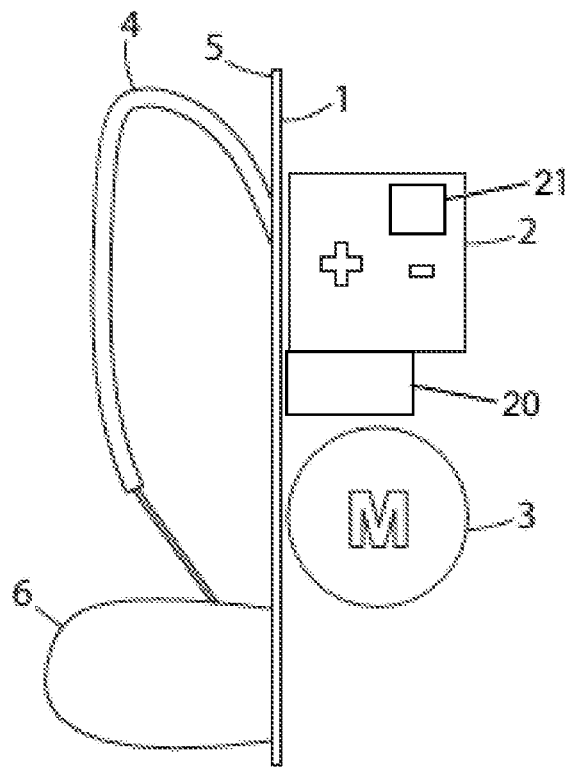
FIG. 1 shows, in a schematic side view, a drive system which is formed as a backpack and which has an energy store and a drive motor.

FIG. 1 shows, in a schematic side view, a drive system designed in the form of a backpack, having a carrying frame 1, which may be designed for example as a carrying plate or carrying frame.

On the rear side, facing away from the operator, of the carrying frame 1, there is fastened a storage battery 2 which serves as energy store. The storage battery 2 may be received in a storage battery receptacle, which is provided specifically for this purpose and which serves as a fastening device, and thus fastened to the carrying frame 1. The storage battery receptacle may for example have an insertion slot or storage battery housing into which the storage battery 2 is exchangeably inserted. The insertion movement may take place in particular from above, such that the storage battery 2 is reliably held at its bottom side. When the storage battery 2 has been depleted, it can be removed from the storage battery receptacle and replaced with a fresh storage battery 2. The carrying frame 1 additionally includes an electrical connection device 20. The electrical connection device 20 allows for connection to a work apparatus An electric drive motor 3 is also carried by the carrying frame 1. The drive motor 3 is suitably fastened to the carrying frame. The fastening may also be detachable, in order to enable the drive motor 3 to be easily exchanged if necessary.

In the case of the drive motor 3, various motor types may be used, which have already been described in detail further above in the introductory part of the description, such that another repetition at this juncture is not necessary.

The drive motor 3 is arranged below the storage battery 2. Since the drive motor generally has a relatively high weight, an advantageous center of gravity of the drive system as a whole is thus achieved.

The drive motor 3 has, as is conventional, a motor shaft (not illustrated), which extends for example perpendicularly with respect to the plane of the drawing of FIG. 1. A coupling device (likewise not illustrated) is provided on the shaft end of the motor shaft, to which coupling device a work apparatus can be coupled. In particular, the work apparatus may have a flexible shaft, which can be coupled to the motor shaft of the drive motor. The coupling between the motor shaft and the flexible shaft is designed as a detachable connection. In particular, this may be a conventional detachable shaft connection, such as for example a bayonet fastener, a sleeve nut or a bolt which is displaceable transversely with respect to the motor shaft, etc. The flexible shaft is conventionally designed as a square shaft which is inserted into a corresponding receptacle on the coupling device or the motor shaft. Numerous variants are known in the prior art for the coupling between the flexible shaft and the motor shaft, such that a more detailed presentation is not necessary.

Fastened to the carrying frame 1 are two carrying straps 4, of which only one is visible in the side view of FIG. 1, because the two carrying straps 4 are arranged one behind the other in relation to the plane of the drawing. The two carrying straps 4 may be designed similarly to the carrying straps on a typical hiking backpack, and may for example have padding in order to enable them to be worn comfortably by the operator on their two shoulders. The carrying straps 4 are fastened by means of their respective ends to the top side and to the bottom side of the carrying frame 1.

A carrying handle 5 may be provided at the upper end of the carrying frame 1 in order to make it easier for the user to carry the carrying device by hand.

A waist or hip strap 6 is attached to the bottom side of the carrying frame 1. The hip strap 6 may also be designed similarly to that in the case of a hiking backpack, in order to provide the operator with similar comfort. In particular, the hip strap 6 is suitable for supporting a considerable part of the total weight on the hip of the operator. In this way, the back and shoulders of the operator are relieved of load.

The hip strap 6 is in two parts and has a left-hand and a right-hand strap half, wherein only the left-hand strap half is visible in FIG. 1. The two strap halves may be closed by means of a conventional strap fastener in front of the abdomen of the operator to form an encircling strap.

The hip strap 6 may also be formed as a simple hip support, that is to say not as an encircling strap (possibly with a strap fastener in order to close the two strap halves to form an encircling strap). Rather, it is also possible merely for two support surfaces to be provided by the hip strap 6, by means of which a certain support action on the hip of the operator is made possible.

Figure 2:
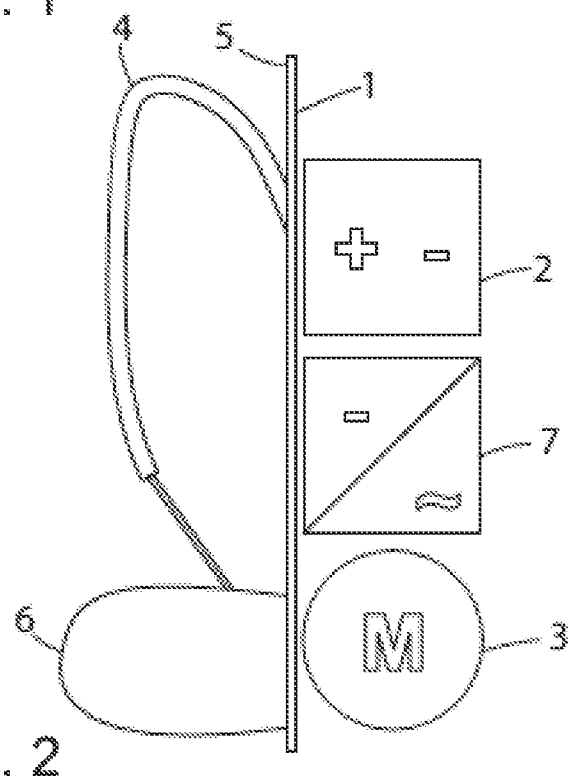
FIGS. 2 to 6 show different variants of the drive system of FIG. 1.

FIG. 2 shows a variant of the arrangement of FIG. 1. Here, a frequency transformer 7 is arranged as a further component in addition to the components already mentioned.

The frequency transformer 7 is connected electrically between the storage battery 2 and the drive motor 3 and serves for converting the direct current drawn from the storage battery 2 into a suitable current for the drive motor 3. In particular, it is possible here for the direct current from the storage battery 2 to be transformed into an alternating current with suitable frequency and voltage.

As in the embodiment of FIG. 1, the drive motor 3 is installed in a lower region on the carrying frame 1, in order to realize an expedient center-of-gravity distribution on the carrying frame 1 for the wearer or user. Owing to the advantageous weight distribution on the carrying frame 1, the shoulders are relieved of load via the carrying straps 4, whilst the major part of the weight is accommodated by the hip or the pelvic bone of the user.

Figure 3:
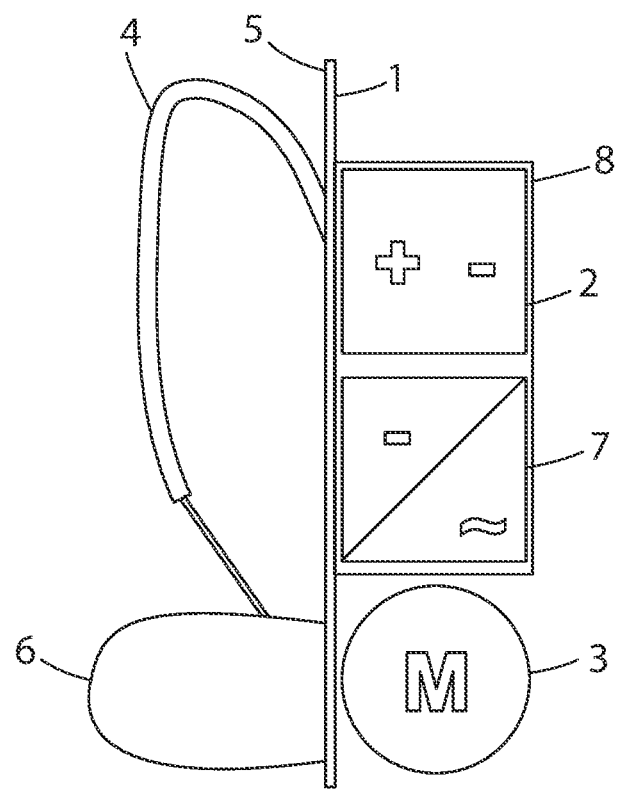

FIG. 3 is a variant in relation to FIG. 2. Here, the storage battery 2 and the frequency transformer 7 form a structural unit 8. The storage battery 2 and the frequency transformer 7 can possibly be removed jointly, in the form of the structural unit 8, from the carrying frame 1 and replaced with another structural unit.

Figure 4:
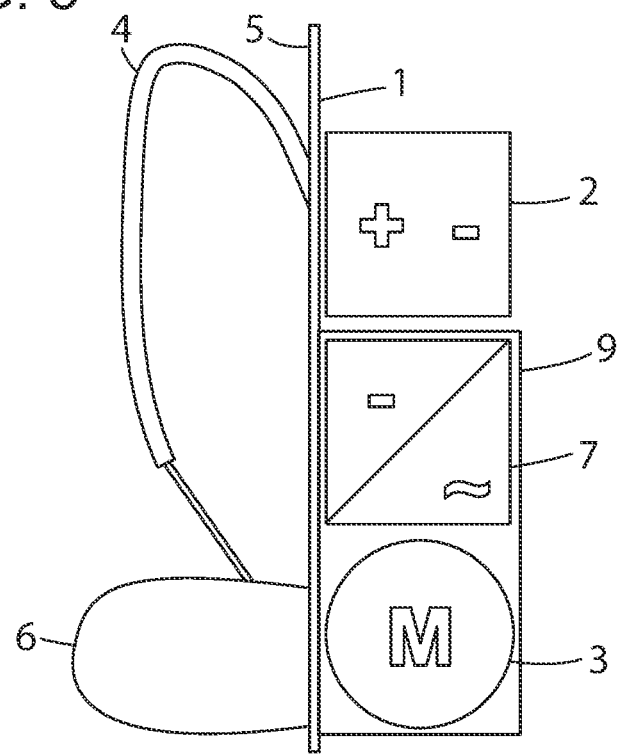

FIG. 4 shows a further variant, in which, in turn, the drive motor 3 and the frequency transformer 7 form a structural unit 9.

Figure 5:
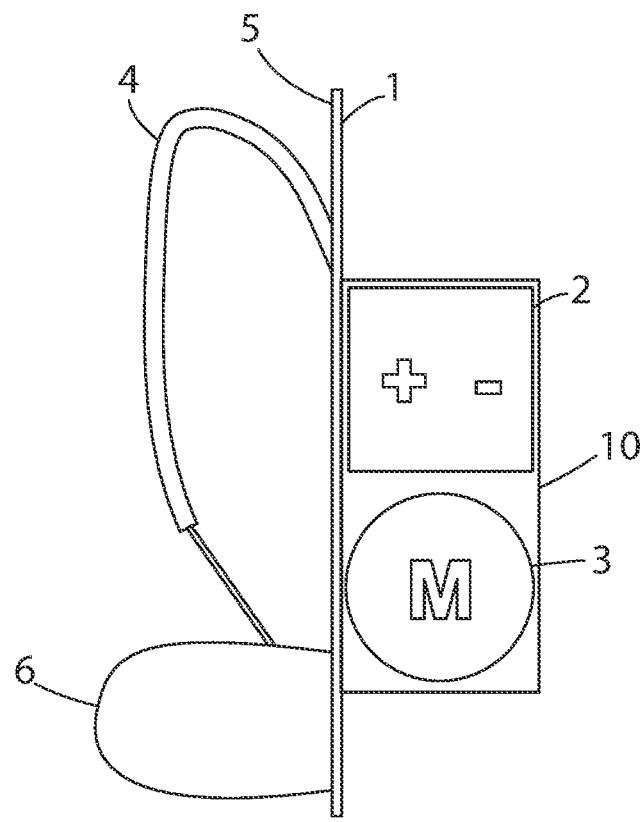

Analogously, FIG. 5 shows a variant in which the storage battery 2 and the drive motor 3 form a structural unit 10.

Figure 6:
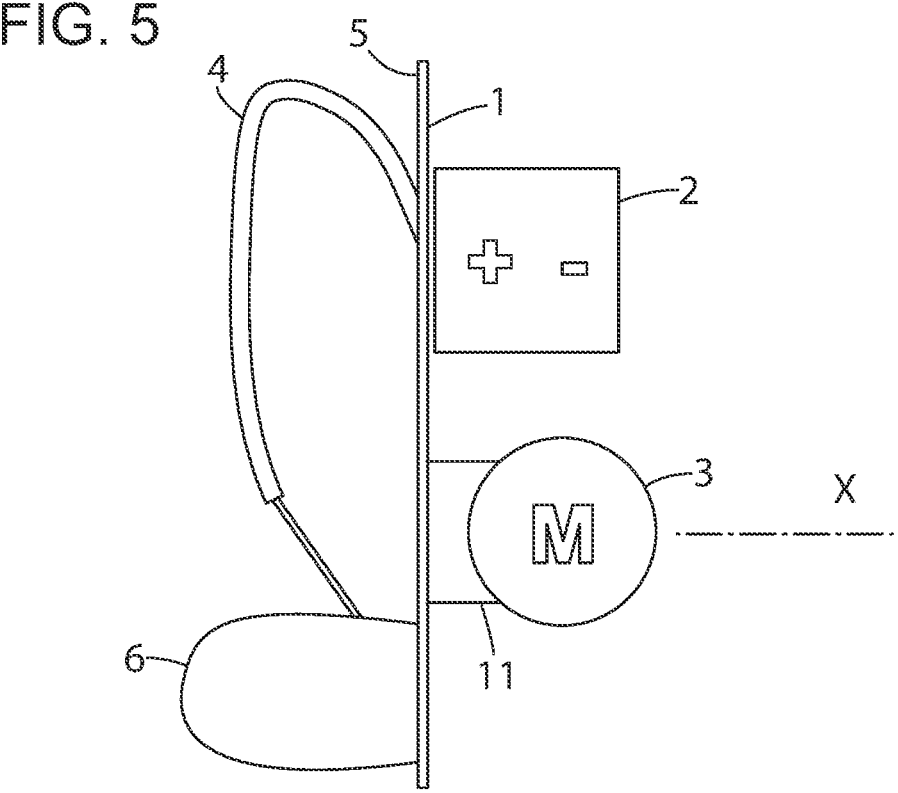

FIG. 6 shows a variant in which the drive motor 3 is fastened to the carrying frame 1 by means of a corresponding motor holder 11.

Whereas, in the variants of FIGS. 1 to 5, the drive motor 3 is only fastened in a suitable manner to the carrying frame 1, the motor holder 11 makes it possible for the motor 3 to be able to be moved relative to the carrying frame 1.

It is thus possible for the drive motor 3 to be able to be pivoted, for example through 90° or through 180°, about a pivot axis X extending perpendicular to the carrying frame 1. It is thus possible for the motor shaft and thus the coupling point for the work apparatus to be able to be displaced in a suitable manner. For example, the coupling point can be selectively positioned to the left or to the right of the back of the operator. It is likewise possible—in the case of a 90° rotation—for the coupling point to be displaced downward, such that the flexible shaft is led away vertically downward.

In one variant, the motor holder 11 also makes it possible for the drive motor 3 to be able to be displaced—for example on a rail—relative to the carrying frame 1 in the direction of an arrow. This is depicted in particular by the illustrations in FIGS. 7A and 7B, which show the drive system in a rear view.

Figure 7A:
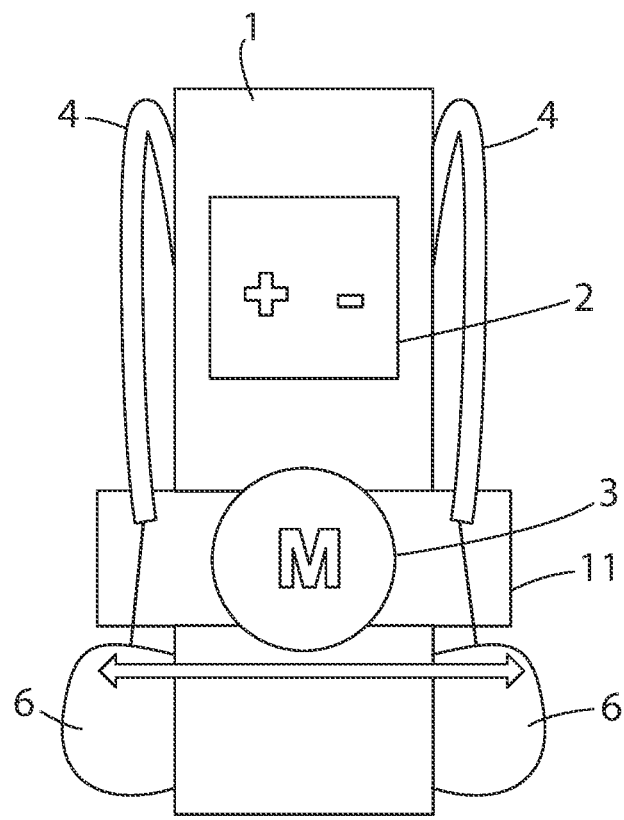
FIGS. 7A and 7B show two rear views of the drive system of FIG. 6.

In FIG. 7A, the drive motor 3 is situated centrally with respect to the carrying plate 1.

Figure 7B:
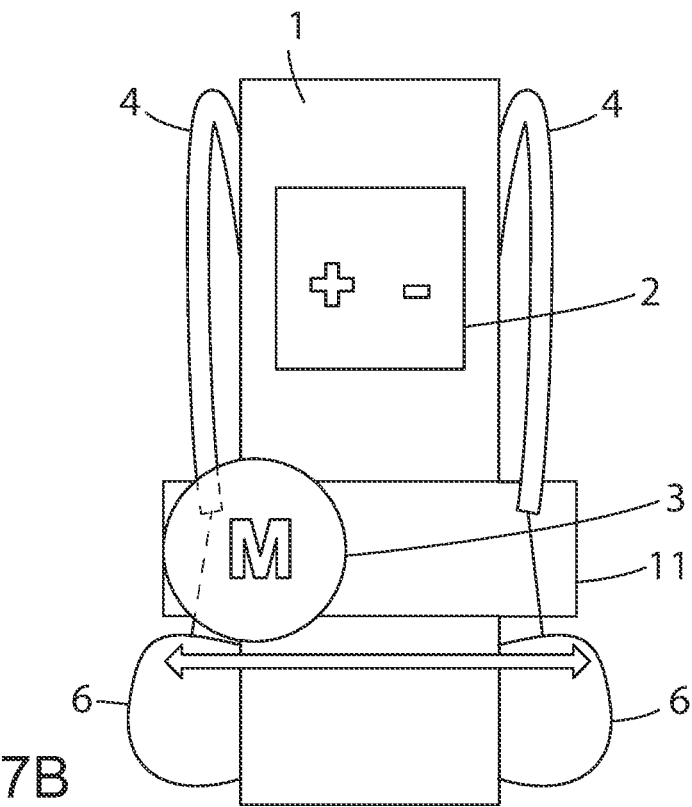

By contrast, in FIG. 7B, the drive motor 3 has been displaced to the left in the direction of an arrow, and is thus situated above the left hip of the operator when the backpack-like drive system is worn by the operator.

As an alternative to the abovementioned position of the drive motor 3, said drive motor may also be arranged above the storage battery 2 or at the same height as the storage battery 2. In particular, the motor shaft of the drive motor 3 may be oriented vertically upward, such that a connected flexible shaft extends over a shoulder of a user. This facilitates the work of the user, because a part of the weight of the flexible shaft is supported by the flexural stiffness of the flexible shaft.

The drive motor 3 may also be arranged so as to be freely pivotable, in particular rotatable about a horizontal axis X (see FIG. 6) which is perpendicular to the carrying frame, such that the motor shaft can point to both sides of a user and also upward or downward.

Figure 8:
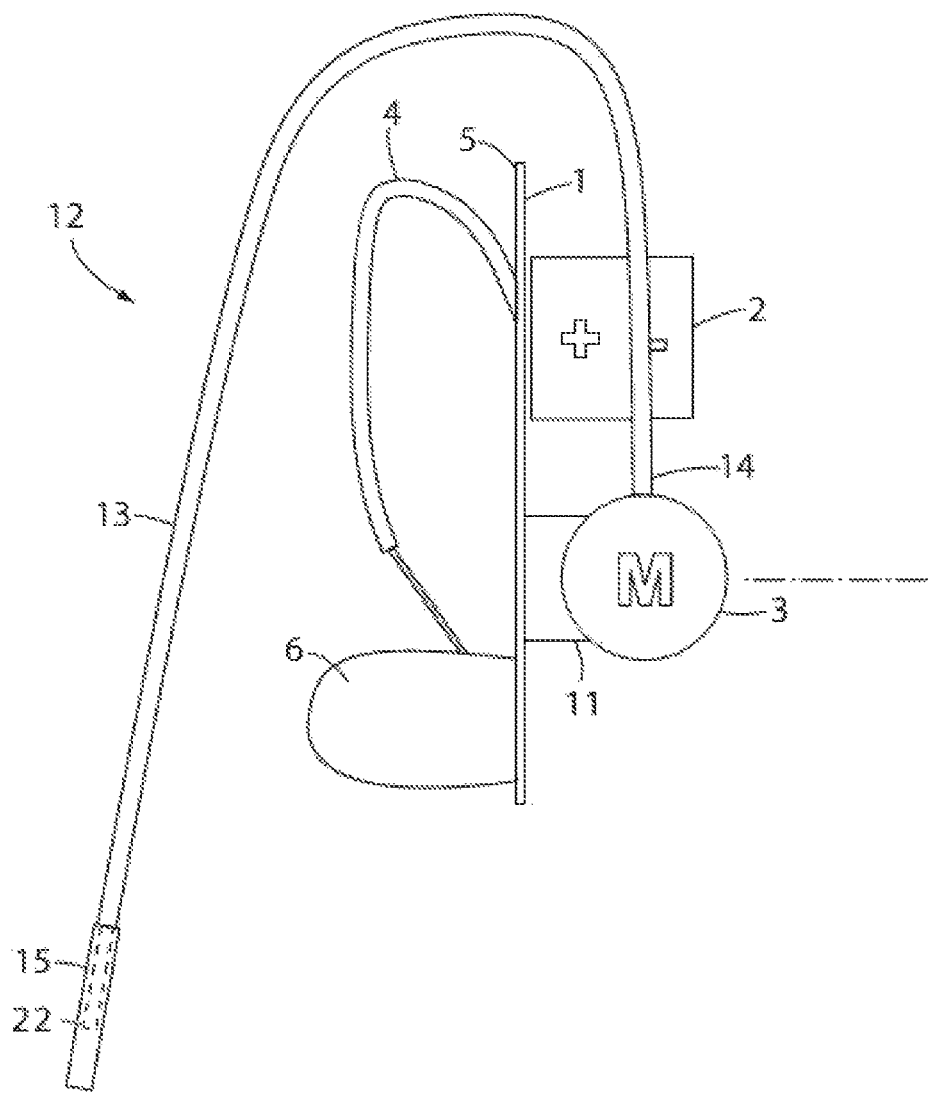
FIG. 8 shows the drive system for driving an internal vibrator for the compaction of concrete.

FIG. 8 shows a usage example for the use of the drive system for driving an internal vibrator 12 for the compaction of concrete that is still in a flowable state.

The construction of such an internal vibrator 12, also referred to as flexible-shaft vibrator, is known per se. The internal vibrator 12 has a flexible drive shaft 13 which is led in a protective hose and which is connected at one end by means of a coupling device 14 to a motor shaft (not illustrated) of the drive motor 3 and at its other end to a so-called vibrator cylinder 15. The vibrator cylinder 15 is designed as a cylindrical hollow body, in the interior of which an imbalance shaft 22 is wobbly mounted (see FIG. 8). The imbalance shaft 22 can be set in rotation with the drive motor 3 via the drive shaft 13, whereby vibrations are generated which can be transmitted via the vibrator cylinder 15 to the concrete that is to be compacted. The vibrator cylinder 15 is also referred to as vibrator casing or vibration body.

In the example shown in FIG. 8, the motor shaft is—in relation to a user wearing the carrying frame 1—directed vertically upward, such that the drive shaft 13 is also initially led vertically upward. Over its further course, the flexible drive shaft 13 curves forward over the shoulder of the user and can thus be easily controlled by the user for the purposes of concrete compaction.

Figure 9:
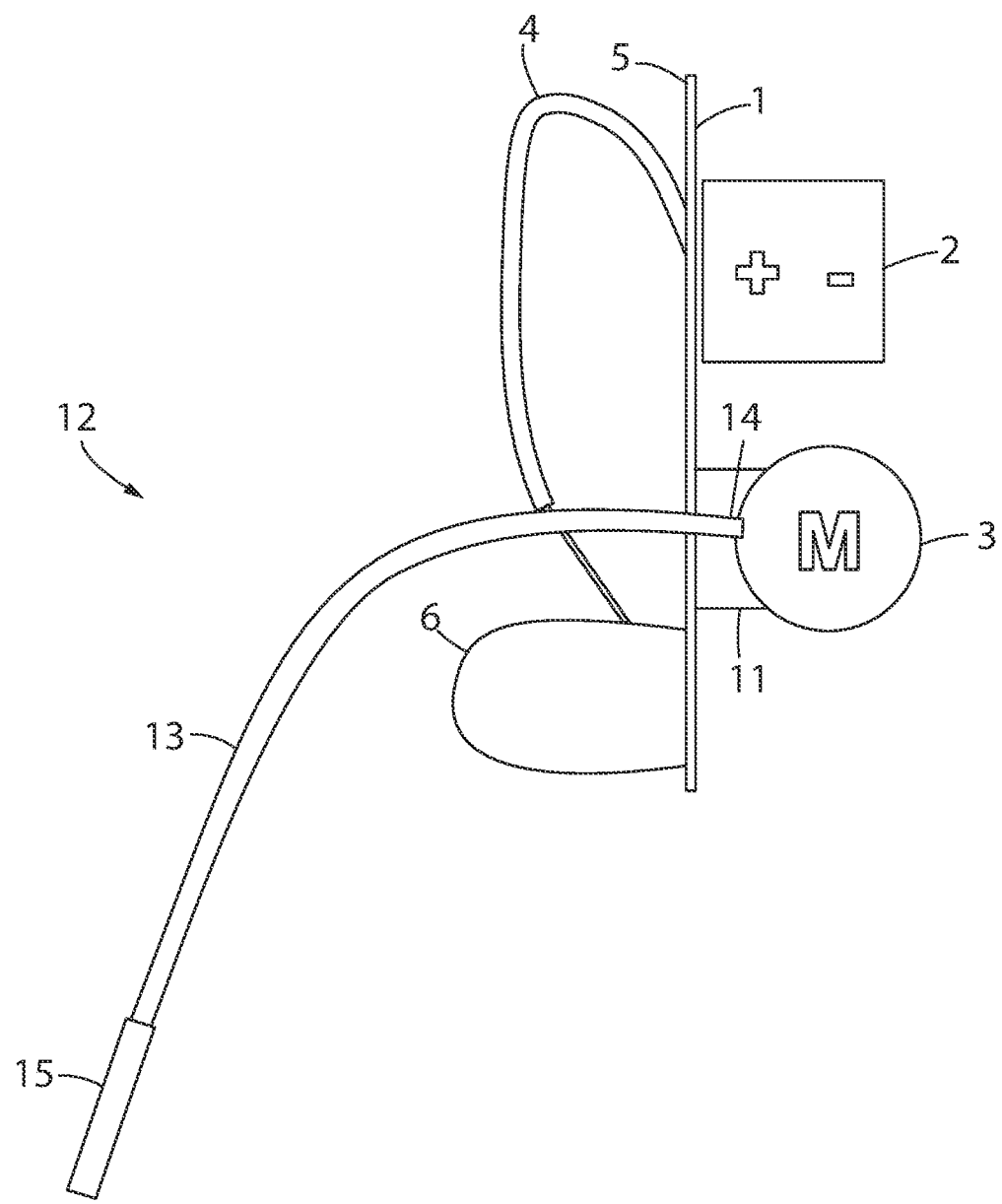
FIG. 9 shows another operating position in relation to the variant of FIG. 8.

FIG. 9 shows a variant in relation to FIG. 8, in which the motor shaft of the drive motor 3 is led horizontally forward (in relation to the user or the intended wearing position), such that the coupled drive shaft 13 likewise extends forward. It is expediently possible for the drive shaft 13 to be designed to be shorter in this case than in the example of FIG. 8.

Figure 10:
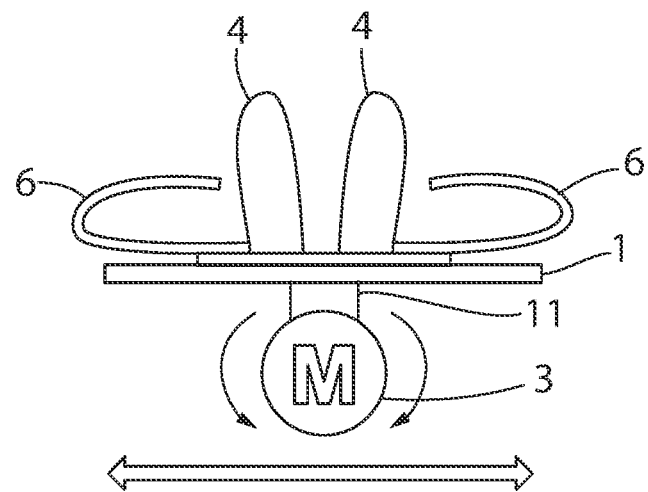
FIG. 10 is a plan view of the drive system.

FIG. 10 shows a plan view of the drive system, with the drive motor 3 held on the carrying frame 1 by the motor holder 11, and different position variants and movement directions of the drive motor 3 relative to the carrying frame 1.

Figure 11:
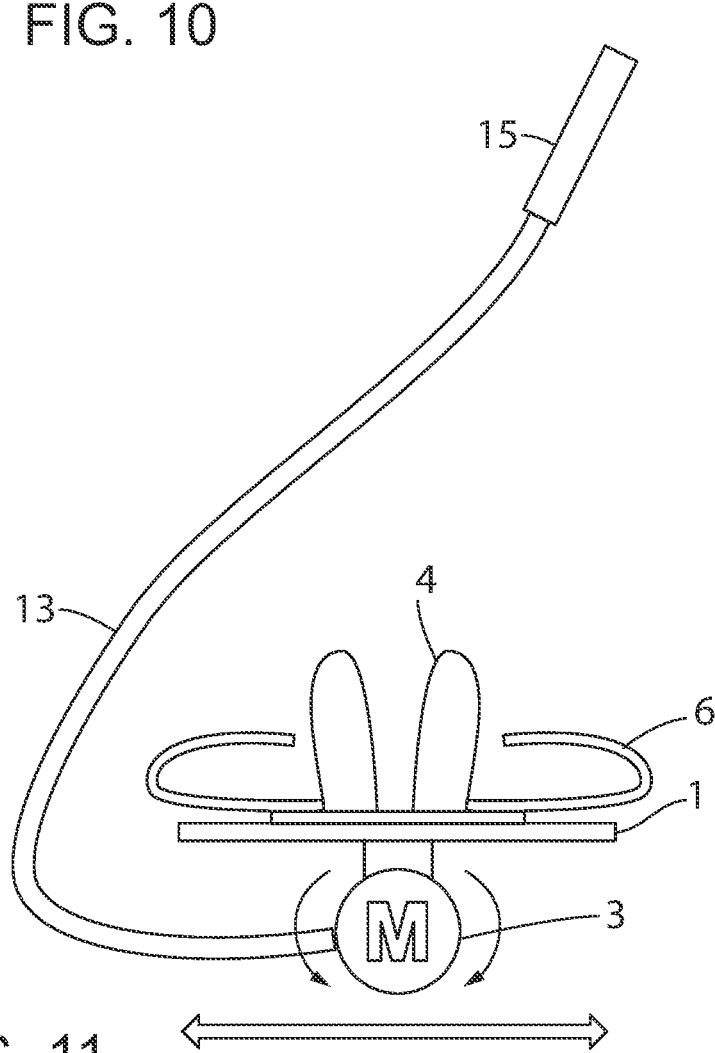
FIG. 11 shows a further operating position in relation to the variant of FIG. 8.

FIG. 11 shows a further usage example in a plan view, in the case of which the drive shaft 13 is led laterally past the operator and past the carrying frame 1 on the left.

Figure 12:
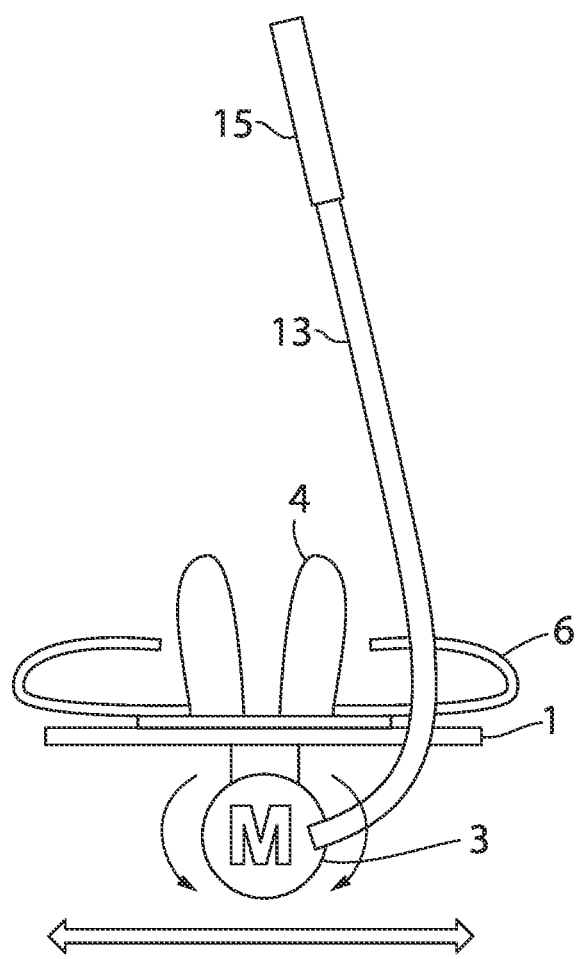
FIG. 12 shows yet another variant in relation to FIG. 8.

In the example of FIG. 12, the drive shaft 13 is led over the shoulder (not illustrated) of the operator. This usage situation is similar to that of FIG. 8.

Figure 13:
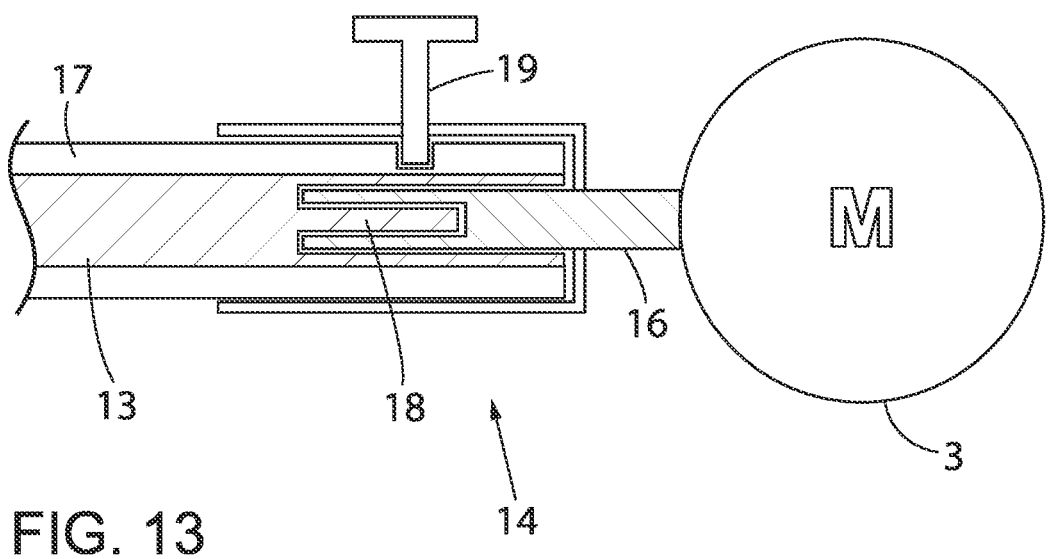
FIG. 13 shows, in a schematic illustration, a coupling device for the coupling of a work apparatus that is to be driven by the drive motor.

FIG. 13 shows an example for the coupling device 14 for the connection of a motor shaft 16 of the drive motor 3 to the drive shaft 13.

The drive shaft 13 is guided rotatably in a protective hose 17. The protective hose 17 accordingly also serves as a guide or operator control hose. The end of the drive shaft 13 is formed as a square 18, into which the correspondingly suitably designed end of the motor shaft 16 is inserted in order to transmit the torque from the motor shaft 16 to the drive shaft 13. To secure the plug connection between the motor shaft 16 and the drive shaft 13, a bolt 19 is provided.

In all variants, a switching device 21 may be provided, which is designed to selectably switch the current supply between the storage battery 2 and the drive motor 3. For this purpose, the switching device can for example selectably produce and/or shut off a current flow between the at least one storage battery 2 and the frequency transformer 7. It is furthermore conceivable for the switching device 21 to be able to produce and/or shut off the current supply between the frequency transformer 7 and the drive motor 3. The switching device 21 may furthermore also be arranged within the storage battery 2, such that the terminals of the storage battery 2 can be switched into a deenergized state during an exchange, and there is thus no danger to a user.

What is claimed is:

1. A drive system comprising: a carrying device with a wearable carrying frame, the carrying frame including a carrying handle disposed at an upper end of the carrying frame; an energy store carried by the carrying frame; at least one electric drive motor carried by the carrying frame; and a coupling device that is configured to mechanically couple a first end of a flexible drive shaft of an internal concrete vibrator to the at least one electric drive motor of the drive system; wherein the coupling device is further configured to directly transfer rotational movement of the at least one electric drive motor from the at least one electric drive motor to the flexible drive shaft of the internal concrete vibrator; wherein a second end of the flexible drive shaft of the internal concrete vibrator is coupled to a vibrator cylinder of the internal concrete vibrator and configured to directly transfer the rotational movement of the at least one electric drive motor transferred to the flexible drive shaft from the flexible drive shaft to the vibrator cylinder; and wherein the flexible drive shaft is disposed within a flexible operator control hose, the flexible operator control hose extending entirely from the coupling device to the vibratory cylinder.

2. The drive system as claimed in claim 1, wherein the carrying device comprises a shoulder bag or backpack having at least one strap configured to permit the carrying device to be worn over a shoulder of a user.

3. The drive system as claimed in claim 2, wherein two straps are provided that are configured to permit the carrying device to be worn over both shoulders of a user.

4. The drive system as claimed in claim 1, further comprising a transformer device directly attached to the carrying frame and which transforms an electrical current, which is drawn from the energy store, to a current suitable for powering the drive motor.

5. The drive system as claimed in claim 1, further comprising a hip strap which is connected to the carrying frame.

6. The drive system as claimed in claim 1, further comprising an electrical connection device which is carried by the carrying frame and which is configured to electrically connect the work apparatus to the drive system.

7. The drive system as claimed in claim 1, further comprising a switching device which is carried by the carrying frame and which serves for the switching of an electrical connection between the energy store and the drive motor and/or for the switching of an electrical connection between the energy store and a transformer device which transforms an electrical current, which is drawn from the energy store, to a current suitable for powering the drive motor.

8. The drive system as claimed in claim 1, wherein the drive motor is located above the energy store.

9. A powered tool comprising: a carrying device with a wearable carrying frame; first and second shoulder straps extending forwardly of the carrying frame and configured to be worn over shoulders of a user; a hip strap extending forwardly of the carrying frame at a location beneath the shoulder straps and configured to be worn around the hip of the user; an energy store supported on the carrying frame and extending rearwardly of the carrying frame; at least one electric drive motor carried by the carrying frame and extending rearwardly of the carrying frame; and an internal concrete vibrator having a flexible drive shaft and a vibrator cylinder, the flexible drive shaft coupled at a first end to the at least one electric drive motor via a coupling device and coupled at a second end to the vibrator cylinder; wherein rotational movement of the at least one electric drive motor is directly transferred to the flexible drive shaft via the coupling device and then the rotational movement of the at least one electric drive motor directly transferred to the flexible drive shaft is directly transferred to the vibrator cylinder from the flexible drive shaft; and wherein the flexible drive shaft is disposed within a flexible operator control hose, wherein the flexible operator control hose extends the entire distance between the coupling device and the vibrator cylinder, and wherein the operator control hose is configured to be held by an operator during use of the internal concrete vibrator.

10. The powered tool of claim 9, wherein the vibrator cylinder includes a cylindrical hollow body having an imbalance shaft disposed in the interior thereof, the imbalance shaft configured to be set in rotation by the at least one electric drive motor via the flexible drive shaft.

11. The drive system of claim 1, wherein the at least one electric drive motor is pivotably carried by the carrying device.

12. The powered tool of claim 9, wherein the at least one electric drive motor is pivotably supported on the carrying frame.

13. The drive system of claim 11, wherein the at least one electric device motor is pivotable about a vertically oriented axis in relation to an intended wearing position.

14. The powered tool of claim 12, wherein the at least one electric device motor is pivotable about a vertically oriented axis in relation to an intended wearing position.

15. The powered tool of claim 9, wherein the first end of the flexible drive shaft is directly coupled to the at least one electric drive motor via the coupling device; and
wherein the second end of the flexible drive shaft is directly coupled to the vibrato cylinder.

16. The drive system of claim 1, wherein the vibrator cylinder includes a cylindrical hollow body having an imbalance shaft disposed in the interior thereof, the imbalance shaft being configured to be set in rotation by the at least one electric drive motor via the flexible drive shaft.

17. The drive system of claim 1, further comprising an operator control device arranged on the carrying device.

18. The powered tool of claim 9, further comprising an operator control device arranged on the carrying device.

* * * * *